United States Patent [19]

Clauss et al.

[11] 3,926,981

[45] Dec. 16, 1975

[54] PROCESS FOR PREPARING 3,4-DIHYDRO-1,2,3-OXATHIAZINE-4-ONES

[75] Inventors: Karl Clauss, Rossert; Horst Schnabel, Steinbach, Taunus; Harald Jensen, Frankfurt am Main, all of Germany

[73] Assignee: Hoechst Aktiengesellschaft, Frankfurt (Main), Germany

[22] Filed: May 30, 1974

[21] Appl. No.: 474,658

[30] Foreign Application Priority Data

June 1, 1973 Germany............................ 2327804

[52] U.S. Cl...... 260/243 R; 260/482 R; 260/543 R; 260/556 A; 426/217
[51] Int. Cl.². ...................................... C07D 291/06
[58] Field of Search..................... 260/243 R, 243 A

[56] References Cited
UNITED STATES PATENTS
3,689,485  9/1972  Clauss et al........................ 260/243

*Primary Examiner*—John M. Ford
*Attorney, Agent, or Firm*—Curtis, Morris & Safford

[57] ABSTRACT

Process for preparing 3,4-dihydro-1,2,3-oxathiazine-4-ones and their salts which comprises the addition of chlorosulfonylisocyanate to a β-ketocarboxylic acid tert.-alkyl ester, conversion of the addition product obtained at temperatures of from 40° to 100°C by means of separation of $CO_2$ and alkylene into the β-ketocarboxylic acid amide-N-sulfochloride, by cyclization of same in an aprotic diluent by means of separation of hydrogen chloride — either in the presence of acid-binding agents or by heating up to temperatures above 50°C — and by conversion of the reaction products obtained in known manner into oxathiazinones or salts thereof.

10 Claims, No Drawings

PROCESS FOR PREPARING 3,4-DIHYDRO-1,2,3-OXATHIAZINE-4-ONES

The German "Offenlegungsschrift" No. 2,001,017 describes new compounds which are derivatives of the 3,4-dihydro-1,2,3-oxathiazine-4-one ring system, their properties as artificial sweetener and process for their preparation. The compounds are prepared by cyclization of β-ketocarboxylic acid amide-N-sulfofluorides in the presence of water with bases. The process for preparation is based on the surprising cyclization which β-ketocarboxylic acid-N-sulfofluorides undergo in aqueous bases. An attempt to realize this reaction also with the corresponding N-sulfochlorides failed, however. It is further known (cf. R. Graf, "Angewandte Chemie" 80, 183 (1968) that carboxylic acid amide-N-sulfochlorides convert in aqueous medium via unstable sulfonic acids into carbonamides:

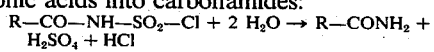

Acylated sulfamide acid esters, in presence as well as in absence of bases, are obtained with alcohols:

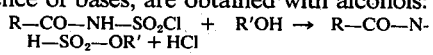

If, e.g., acetoacetic acid amide-N-sulfochloride is dissolved in methanol at room temperature and if potassium hydroxide — dissolved in methanol — is added to this solution, no cyclization to oxathiazinone occurs, but the acetoacetic acid amide-N-sulfoacid methyl ester is formed at a yield or more than 80% in form of its potassium salt, from which may be obtained by an acid treatment free methyl ester having a melting point of from 73° to 74°C:

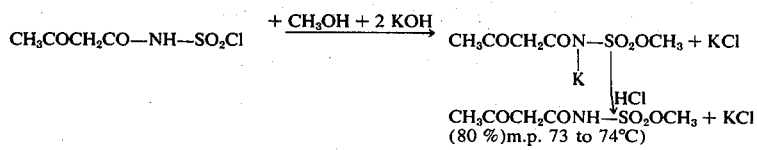

Also unsuccessful was the attempt to cyclize at a temperature from 0°C to the boiling point of the mixture acetoacetic acid amide-N-sulfofluoride in aprotic solvents such as ethylacetate with organic bases such as triethyl amine to yield oxathiazinonedioxide. Though the sulfofluoride used forms with the amine a salt having the formula,

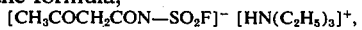

no cyclization occurs and after acidification of the salt the unaltered sulfofluoride can be recovered only in its crystal form.

It comes, therefore, as a surprise that cyclization is easy in case of treating acetoacetic acid amide-N-sulfochloride in an aprotic solvent or diluent with hydrogenchloride-binding agents or by thermal splitting off of HCl, yielding 6-methyl-3,4-dihydro-1,2,3-oxathiazine-4-one-2,2-dioxide which is particularly interesting as an artificial sweetener.

Subject of the present invention is, therefore, a process for preparing 3,4-dihydro-1,2,3-oxathiazine-4-ones and their salts the acid form of which corresponds to the general formula

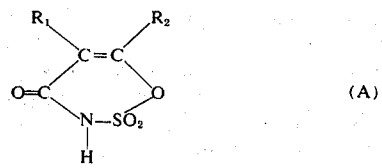

wherein $R_1$ represents hydrogen or an alkyl group having from 1 to 4 carbon atoms and $R_2$ represents an alkyl group having from 1 to 4 carbon atoms, by adding chlorosulfonylisocyanate to a β-keto-carboxylic acid-tert.-alkyl ester of the general formula

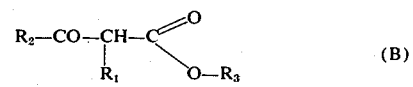

wherein $R_1$ and $R_2$ have the aforesaid meaning and $R_3$ represents a tert. alkyl group having from 4 to 10 carbon atoms, by converting the addition product obtained at temperatures from 40° to 100°C by separation of $CO_2$ and alkylene to yield β-ketocarboxylic acid amide-N-sulfochloride, submitting same to cyclization in an aprotic diluent by separation of hydrogen chloride — either in the presence of acid binding agents or by heating up to temperatures above 50°C — while the reaction products thus obtained are converted, optionally, into their salts or into free oxathiazinone in known manner.

The tert. alkyl esters used are those containing in their ester group from 4 to 10 carbon atoms, preferably from 4 to 6 carbon atoms. Since the ester group is subject to separation in course of the process, its character is of no critical importance. Particular preference is given to a tert. butyl ester. Therefore, same is picked for the following explanations of the process according to the present invention which is carried out in analogy in the care of using esters with other tert. alcohols.

The process according to the invention can be carried out in a preferred embodiment with acetoacetic acid -tert.-butyl ester, the aforesaid formulas (A) and (B) having radical $R_1$ to stand for hydrogen, $R_2$ for methyl and $R_3$ for tert.-butyl, without, however, being limited to this initial component, by first preparing acetoacetic acid-tert.-butyl ester (I) in known manner from diketene and tert.-butanol. In a second phase (I) is submitted to a reaction with chlorosulfonylisocyanate (II) to yield α-[N-chloro-sulfonylcarbamoyl]-acetic acid-tert.-butyl ester (III). This addition is performed in an aprotic solvent or diluent, preferably in ethers such as diethyl ether, diisopropyl ether, tetrahydrofurane or dioxane, furthermore carbon chlorides such as chloroform or other aliphatic or aromatic hydrocarbons with boiling points preferably above 20°C, especially above 50°C. It is particularly advantageous to use ether. The reaction temperature for this step is not of critical importance and may be chosen from −20° to +50°, lower temperatures requiring longer reaction time, and at temperatures above appr. +30°C the reaction with chlorosulfonylisocyanate is accompanied by simultaneous cleavage of the reaction product.

The adduct (III) can then be submitted to cleavage in substance or, preferably, in an aprotic solvent or diluent such as, preferably, in chloroform, or in other hydrocarbons halogenated or free of halogen having a boiling point above 50°C, by simply heating to 40° – 100°C, preferably from 40° to 70°C, to yield acetoacetic acid amide-N-sulfochloride (IV), $CO_2$ and isobutene. This thermal cleavage becomes active from approx. 50° – 65°C on, starting, however, particularly in a slightly contaminated product, at lower temperatures, too. There is a possibility to lower the cleavage temperature by means of contamination, for example, by adding to the reaction bath fragments of aprotic solvent as mother liquor of previous identical batches, the components contained in the mother liquor obviously catalyze the cleavage reaction and thus allow for a lower cleavage temperature.

The thus obtained acetoacetic acid amide-N-sulfochloride can be converted into the oxathiazinone sought after by splitting off of hydrogen chloride. This cleavage is performed — according to the invention — in an aprotic solvent or diluent in the presence of acid-binding agents or by heating up to temperatures above +50°C.

Suitable aprotic solvents or diluents for this purpose are aromatic hydrocarbons such as benzene, toluene or xylene, ethers such as diethyl ether, diisopropyl ether, glycol dimethyl ether, diethylene-glycol-dimethyl ether, carbon chlorides such as methylene chloride, propylene chloride, chloroform, carbon tetrachloride or trichloro-ethylene, tetrachloro-ethylene or esters such as ethylacetate, butylacetate, propionic acid methyl ester. Cleavage of HCl and cyclization also occurs in liquid sulfur dioxide. Preferred solvents or diluents are benzene, toluene, methylene chloride and especially ethylacetate.

All organic or inorganic substances being able to bind hydrogen chloride may be used as acid binding agents. Preference is given to organic bases, especially the various primary, secondary and tertiary alkyl amines, cycloalkyl amines or phenyl amines, such as methylamine, ethylamine, butylamine, cyclohexylamine, dimethylamine, diethylamine, diisopropylamine, dicyclohexylamine, trimethylamine, pyridine, quinoline as well as ammonia. Particular favorites are tert. amines such as triethyl amine, trimethyl amine and similar ones; furthermore, inorganic bases such as hydroxides, oxides or carbonates of alkaline metals or alkaline earth metals or earth metals also, e.g., potassium hydroxide, sodium hydroxide, calcium hydroxide, magnesium hydroxyde, aluminium hydroxide, calcium oxide, magnesium oxide, potassium carbonate, potassium hydrogen carbonate, sodium carbonate, sodium hydrogen carbonate, magnesium carbonate, calcium carbonate; furthermore, alcoholates such as potassium-methylate, potassium ethylate, potassium-tert.-butylate, sodium-methylate, magnesium-methylate or phosphates such as tert. potassium phophate and sodium pyrophosphate. Sodium sulfate and sodium sulfite or substituted ethylene oxides such as phenoxypropeneoxide can be used. The application of mixtures of various acid-binding substances is also possible. The acid-binding agent is to be used in quantities at least twice the stoichiometric quantity, preferably twice the stoichiometric quantity plus an excess of up to 10%, calculated on the sulfochloride (IV). Applying larger quantities does no harm, especially when such acid binding agents are used which are soluble in the reaction medium to a limited extent only.

The separation of HCl and cyclization to yield an oxathiazinone-ring in an aprotic diluent can be performed in the presence of an acid-binding agent within a wide temperature range, preferably from approx. —80° to approx. +80°C, especially within a zone from —30° to +50°C, the temperature to be chosen depending on the diluent and the acid-binding agent utilized as well as on the thermal stability of the reaction product.

Some acid-binding agents may lead to secondary reactions, such as, for example, when using amines with reactive hydrogen at the nitrogen atom. In this specific case, for example, the desired 6-methyl-3,4-dihydro-1,2,3-oxathiazinone-4-one-2,2-dioxide (V) is formed, but also thiadiazine (VI) (identical with the compound described by R. Die et al., J. Heterocyclic Chem.9 (1972), 973) in minor quantities:

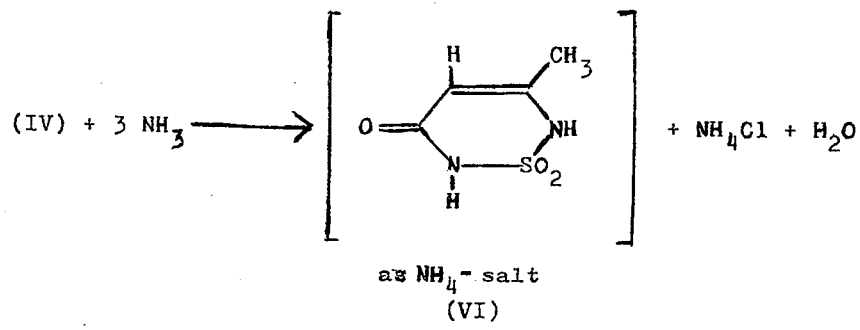

as $NH_4^-$ salt
(VI)

But it is easy to separate by crystallization these impurities from the desired oxathiazinone.

By simply heating the sulfochloride (IV) in one of the specified aprotic solvents or diluents in absence of an acid-binding agent to temperatures above 50°C, preferably from 50° to 100°C, hydrogen chloride is split off and the remainder of the molecule cyclizes to yield oxathiazinone (V). This thermal cleavage is preferably performed under reflux of the diluent and/or under passage of an inert gas such as nitrogen, air or $CO_2$ for eliminating the separated hydrogen chloride. The higher the reaction temperatures, the more threatens the risk of secondary reactions.

The reaction scheme according to the invention can be represented as follows, the acetoacetic acid-tert.-butylester serving as example:

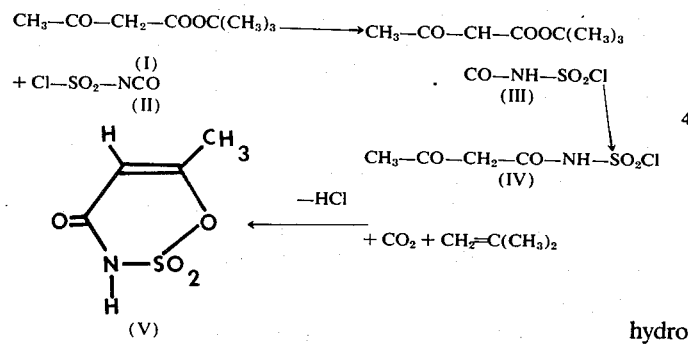

It is, of course, possible as well to use in this reaction scheme other esters, too, which correspond to the general formula (B)

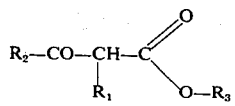

$R_1$ = H, alkyl having from 1 to 4 carbon atoms
$R_2$ = alkyl having from 1 to 4 carbon atoms
$R_3$ = tert. alkyl having from 4 to 10 carbon atoms
with results similar to those obtained with propionylacetic acid-tert.-butylester, butyroylacetic acid-tert.-butyl ester, isobutyroylacetic acid-tert.-butyl ester, valeroylacetic acid-tert.-butyl ester, α-methylacetic acid-tert.-butyl ester, α-propylpropionylacetic acid-tert.-butyl ester or acetoacetic acid-tert.-hexyl ester. However, the easy access to acetoacetic acid-tert.-alkyl esters from diketene and tert. alcohols is the reason for their being preferred as starting material.

While converting product (IV) into product (V) with the preferred excess quantity of acid-binding agents, the result obtained — besides the HCl-addition products of these agents (or their secondary products) — are the salts of compound (V) having a strongly acid reaction with the corresponding base, for example:

sium salts are the preferred inorganic salts. By submitting (VIIa) or (VIIb) to a treatment with strong acids as well in water as in aprotic solvents, such as ethers, hydrocarbons or esters, the oxathiazinone (V) is set free and may be isolated according to known processing methods:

(VIIa) + HCl $\xrightarrow{ethyl\ acetate}$ [$(C_2H_5)_3NH$]Cl + (V)

Accordingly, the free oxathiazinone (V) can be prepared from its inorganic salts.

As far as the yield in 6-methyl-3,4-dihydro-1,2,3-oxathiazine-4-one-2,2-dioxide is concerned, it is considerably higher — e.g., at 65% to 70% (calculated on diketene) — according to the process of the invention than that obtained according to the process described in German "Offenlegungsschrift" No. 2001 017 (40% calculated on acetylacetone). Furthermore, the process according to the present invention, which uses as starting components sulfochlorides instead of sulfofluorides, is particularly advantageous because so far no satisfactory technological preparation process has been found for the toxic fluorosulfonylisocyanate required for preparing sulfofluorides and because, on the other hand, it is difficult to completely eliminate fluorine ions from an oxathiazinone-product classified as foodstuff, e.g., as artificial sweetener.

The following examples illustrate the invention:

EXAMPLE 1

α-[N-chlorosulfonyl-carbamoyl]-acetoacetic acid-tert.-butyl ester (III)

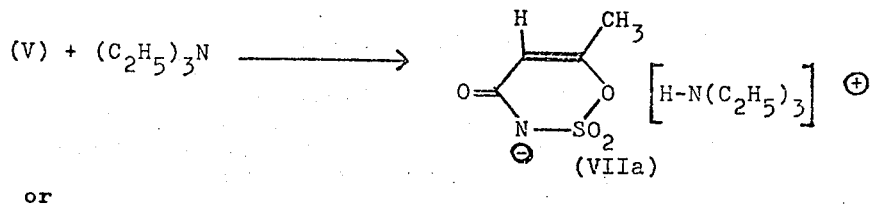

or

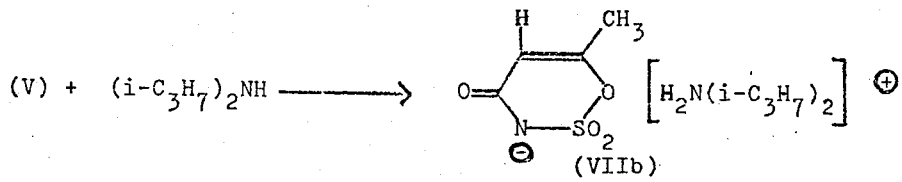

The conversion of the salts of (V) into salts with an another cation respectively in the free acid (V) is performed according to usual methods. Thus it is easy to convert salts like (VIIa) and (VIIb) into the corresponding alkali metal salt or calcium salt by heating with alkali base or milk of lime and separating the amine set free which may be re-used. The non-toxic sodium salts, potassium salts, calcium salts or magne- In a 6-ltr. agitator having a dropping funnel of 1 ltr. and a thermometer, are added dropwise for 2 hours at a temperature of from 15° to 20°C 1,00 l (11.5 mole) of chlorosulfonylisocyanate (II) to a solution of 1,85 l of dist. acetoacetic acid-tert.-butyl ester (I) 11.5 mole) in 2.0 ltr. of dry ether. The reaction heat diminishing, the crystal paste of (III) obtained is cooled to abt. 0°C and suctioned off strictly screened from humidity. A second fraction of (III) is obtained by concentration of the filtrate.

Yield: 3130 g (10.45 mole) of colorless crystals of (III), melting point 76 – 78°C (decompos.), corresponding to 91 % of theory. IR spectrum ($CH_2Cl_2$): 1650, 1560, 1315, 1200 $cm^{-1}$ NMR-spectrum ($CDCl_3$): 1,6 (s), 2,6 (s), 13,5 (s) and 16,1 ppm (s) in proportion 9:3:1:1.

The same results are obtained when using diisopropyl ether instead of diethylether.

EXAMPLE 2

Acetoacetic acid amide-N-sulfochloride (IV)

a. In a 4 ltr. agitator with intensive-cooling device, gas outlet passing through a gasometer and thermometer are blended 2,00 kg (6,68 mole) of the product according to example 1 with 750 ml of chloroform and 250 ml of mother liquor chloroform from a previous identical batch, heated in an oil bath of from 90° to 100°C while agitating until the separation of gas is fading out. Upon cooling to 0°C, the acetoacetic acid amide-N-sulfochloride (IV) is crystallizing in coarse, brilliant crystals having a melting point of from 85° to 86°C.

Yield: 80 to 85 % of theory $C_4H_6ClNO_4S$: MG 199.6

Analysis:
  calc.: C 24.05 %; H 3.0 %; Cl 17.8 %; N 7.0 %
  found: C 24.0 %; H 3.0 %; Cl 18.0 %; N 6.8 %
  IR spectrum ($CH_2Cl_2$): 3280 (NH), 1755 and 1710 (C=O), 1465, 1400 and 1230 $cm^{-1}$ ($SO_2Cl$)
  NMR-spectrum ($CD_3CN$): 2,25 (s) 3, 7 (s) and 10,3 ppm (s) in proportion 3:2:1.

b. 300 g (1,0 mole of the product according to example 1 are molten at a bath temperature of 95°C while stirring vigorously in a one ltr. wide-necked Erlenmeyer flask with agitator; foaming ceases after 10 minutes. The result is cooled, diluted with 200 ml of chloroform and 146 g of colorless crystals of (IV) are isolated, having a melting point of from 83° to 85°C, at a yield of 73 % of theory.

c. The pasty mixture of 300 g (1.0 mole) of the product (III) according to example 1 and 15 ml of a gasoline fraction (boiling point 140° to 160°C) is submitted to a treatment as described in Example 2b at a bath temperature of 95°C.

Immediately upon cooling a dry, friable crystal mass is obtained. After washing with chloroform and drying, 160 g of colorless crystal of product (IV) are isolated, melting point 84° to 86°C (80 % theory).

EXAMPLE 3

6-methyl-3,4,-dihydro-1,2,3-oxathiazinone-4-one-2,2-dioxide-potassium salt 100 ml of triethylamine in 1,5 l of ethylacetate are introduced into a 6-ltr.-agitator equipped with 2 dropping funnels; in course of from 1,5 to 2 hours at an interior temperature of from −5° to 0°C 1,30 l of triethylamine and a solution of 1,00 kg (5.0 mole) of acetoacetic acid amide-N-sulfochloride (IV) in 1,5 l of ethylacetate are added simultaneously and dropwise in such a way that a minor excess of triethylamine is constantly present. The reaction being completed, the crystal paste obtained is heated to 50° to 60°C so as to dissolve the amine-sweetener-salt (VIIa), some of the undissolved triethylammoniumchloride is filtered off and the filtrate is vacuum concentrated thoroughly. For converting the concentrated filtrate into the potassium salt, it is absorbed in 400 ml of water, 570 ml of 10 n aqueous KOH are added, the separated triethylamine (combined with water) is eliminated by vacuum distillation until the residue is devoid of triethylamine. The crystallized product is suctioned off at 0°C. 750 g to 800 g of slightly yellowish crystals of the potassium salt of the compound, 3,4-dihydro-6-methyl-1,2,3-oxathiazine-4-one-2,2-dioxide (V) are obtained as first fraction. By concentrating the mother liquors another 80 to 200 g of crude product are obtained. Transcrystallization from water with active coal yields the pure colorless potassium salt of (V) at a yield of 85 to 88% of theory.

EXAMPLE 4

Into a mixture of 80 ml of triethylamine and 300 ml of ethylacetate, which is maintained at a temperature from 15° to 20°C by means of an ice bath, are simultaneously added dropwise from two dropping funnels, while agitating:
  a. a solution of 200 g (1 mole) of acetoacetic acid amide-N-sulfochloride (IV) in 300 ml of ethylacetate and
  b. 200 ml of triethylamine.

The dropwise addition lasts for 30 minutes. Subsequently, agitation is continued for another 30 minutes at 20°C without cooling. 136 g (0.99 mole) of triethylammoniumchloride are isolated and, after concentration of the filtrate, 167 g of crystal oxathiazinone-triethylamine salt (VIIa) are obtained, having a melting point of from 63° to 66°C (63% of theory). A work-up of the mother liquor yields further 11% of the theory of the product (VIIa).

The oxathiazinone-triethylamine salt (VIIa) can be converted into the K-salt according to Example 3.

EXAMPLE 5

To a mixture of 15,5 ml (0.11 mole) of triethylamine and 50 ml of benzene are added dropwise while stirring and cooling to 20°–22°C, a solution of 10 g (50 mmole) of acetoacetic acid amide-N-sulfochloride (IV) in 20 ml of 1,2-dimethoxyethane (period: 12 minutes), the triethylammonium salts precipitating in crystal form. The solvents are eliminated by vacuum distillation, the residue is absorbed in ice water, 10 ml of concentrated hydrochloric acid are added, extracted thoroughly with ethylacetate and isolated from the extract 7,7 g of the product (V) having a melting point of 115° to 119°C (94% of theory). After recrystallization of a large quantity of chloroform, 7,3 g of colorless needles of oxathiazinone (V) are obtained — having a melting point of 123°C (89% of theory).

EXAMPLE 6

To a mixture of 20 ml of triethylamine and 100 ml of $CH_2Cl_2$ are added simultaneously and dropwise in course of 90 minutes while agitating at temperatures from −5° to 0°C equivalent quantities of:
  a. the solution of 200 g (1.0 mole) of acetoacetic acid amide-N-sulfochloride (IV) in 1,5 l of methylenechloride and
  b. 270 ml of triethylamine.

43 g (0.31 mole) of triethylammoniumchloride which had precipitated as a deposit, were filtered off and the filtrate was vacuum dried. After having added 200 ml of 10 n aqueous KOH, the triethylamine is eliminated by vacuum distillation. After acidifying with concentrated hydrochloric acid and extraction with ethylacetate, 156 g (0.955 mole) of colorless crystals of oxathiazinone (V) are obtained having a melting point of 119° to 121°C.

Net yield after recrystallization from chloroform and a small quantity of ethylacetate: 147 g (0.90 mole) of oxathiazinone (V) having a melting point of 123°C (90% of theory).

EXAMPLE 7

A mixutre of 600 ml of ethylacetate and 20 ml of diisopropylamine is introduced into a 4 ltr. agitator apparatus equipped with 2 dropping funnels; while stirring well at 0° to −5°C equivalent parts by volume are simultaneously added dropwise of a solution of 400 g (2 mole) of acetoacetamide-N-sulfochloride (IV) in 600 ml of ethylacetate and 560 ml of diisopropylamine. The thick crystal paste thus obtained is then heated to 60°C and filtered while still hot. The filter cake is submitted repeatedly to boiling with total 2,5 l of ethylacetate. The totality of the filtrates yield at 0°C 470 g of colorless crystals of oxathiazinone salt (VIIb) having a melting point of from 96° to 101°C which still contain a minor quantity of chlorine and which can be identified as the diisopropylamine salt of (V).

NMR-spectrum (CDCL$_3$): 1,4 (d,J = 7Hz), 2,1 (d,J = 1Hz, abt. 3,5 (sept.,J = 7Hz), 5,5 (q,J = 1Hz) and 8,5ppm (s) in proportion 12:3:2:1:2.

So as to convert into the potassium salt of (V), 467 g (calc. 1.77 mole) of the aforedescribed crystals of (VIIb) are blended with 180 ml of 10 n aqueous KOH while stirring and subsequently vacuum-freed completely of amine. The crude potassium salt of oxathiazinone (V) is submitted to recrystallization from water with active coal and then yields 300 g of colorless crystals (1.5 mole) of the potassium salt of (V), corresponding to 75% of theory.

EXAMPLE 8

26 g (0.65 mole) of powdery magnesium oxide are suspended in 200 ml of 1,2-dimethoxyethane and a solution of 100 g (0.5 mole) of acetoacetic acid amide-N-sulfochloride (IV) in 100 ml of dimethoxyethane is added. Subsequently, stirring takes place for 24 hours at room temperature, the solvent being eliminated by vacuum-evaporation, the residue being put to reaction with 300 g of water/ice and 130 ml of concentrated hydrochloric acid. By means of extraction with ethylacetate 53 g of crude crystal oxathiazinone (V) are isolated, melting point from 133° to 117°C.

EXAMPLE 9

20 g (0.1 mole) of acetoacetic acid amide-N-sulfochloride (IV) and 20 g (0.2 mole) of calcium carbonate - powder are boiled under reflux in 150 ml of methylene chloride for 19 hours. After the usual work-up, 11 g of almost colorless crystal oxathiazinone (V) are isolated as crude product, melting point from 110° to 114°C. Similar results are obtained when magnesium carbonate is used instead of calcium carbonate.

EXAMPLE 10

50 g (0.25 mole) of acetoacetic acid amide-N-sulfochloride (IV) are dissolved in 400 ml of methylene chloride. 11 g (0.275 mole) of powdery magnesium oxide are added and heated under reflux for 9 hours. The solvent is then eliminated by distillation and the residue blended with 100 g of ice, 100 ml of water and 50 ml of concentrated hydrochloric acid. The solution newly formed is submitted to extraction with ethylacetate. After drying and concentrating the extract by evaporation, a residue of 30 g (73.6 % of theory) of oxathiazinone (V) is obtained, having a melting point of from 118° to 121°C.

EXAMPLE 11

To 5 g (50 mMole) of cyclohexylamine in 50 ml of methylene chloride are added dropwise simultaneously, but separately, two solutions, while stirring for 30 minutes at 0°C:

Solution a: 90 ml of a solution of 10 g (50 mMole) of acetoacetic amide-N-sulfochloride (IV) in methylene chloride and Solution b: 90 ml of a solution of 10 g (100 mMole) of cyclohexylamine in methylene chloride.

The batch is allowed to warm up to room temperature and stirring is continued for another 20 minutes. Then 50 ml of 2 n hydrochloric acid are added and, after blending well, the organic phase is separated. The aqueous phase is extracted with ethylacetate. After having eliminated the totality of the organic extracts by evaporation, a residue of 8 g of a substance is obtained which crystallizes after addition of a minor quantity of chloroform, consisting by abt. 60 % of oxathiazinone (V).

EXAMPLE 12

Into a solution of 20 ml of triethylamine in 300 ml of ethylacetate which has been cooled to −50°C, the following additions are made dropwise simultaneously from two dropping funnels, while stirring a. a solution of 200 g (1.0 mole) of acetoacetic acid amide-N-sulfochloride (IV) in 300 ml of ethylacetate and b. 260 ml of triethylamine.

Subsequently the mixture is heated to from 50° to 60°C, some of the undissolved triethylammoniumchloride (135 g or 0.98 mole) is suctioned off and, after having concentrated the filtrate, the oxathiazinone-salt (VIIa) is allowed to precipitate by crystallization, 225 g of product (VIIa) having a melting point of from 63° to 66°C (85 % of theory) are isolated.

Upon heating the product (VIIa) with the calculated quantity of slaked lime in aqueous medium, the triethylamine is eliminated by distillation and after having vacuum-concentrated the solution, the calcium salt of product (V) is obtained as a white powder at an almost quantitative yield.

What is claimed is:

1. A process for preparing an oxathiazinone that is a 3,4-dihydro-1,2,3-oxathiazine-4-one of the formula

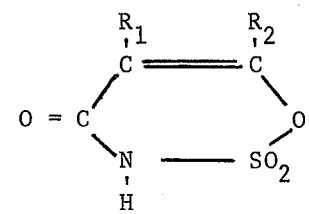

wherein R$_1$ is hydrogen or an alkyl of 1 to 4 carbon atoms and R$_2$ is an alkyl group of 1 to 4 carbon atoms, or a salt of said oxathiazinone, which comprises: reacting chlorosulfonylisocyanate and a β-ketocarboxylic acid-t-alkyl ester of the formula

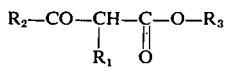

wherein $R_3$ is a tertiary alkyl of 4 to 10 carbon atoms, to form an addition product thereof; cleaving said addition product into $CO_2$, an alkene and β-ketocarboxylic acid amide-N-sulfochloride by heating at a temperature between about 40°C. and about 100°C.; and cyclizing said sulfochloride in an aprotic diluent by splitting off hydrogen chloride.

2. A process according to claim 1 wherein, for cyclizing, said aprotic diluent contains an acid binding agent for said hydrogen chloride.

3. A process according to claim 2 wherein cyclizing is at a temperature between about −30°C. and about 50°C.

4. A process according to claim 1 wherein, for cyclizing, said aprotic diluent is heated above about 50°C.

5. A process according to claim 1 wherein said addition product is formed at a temperature between about −20°C. and about 50°C.

6. A process according to claim 1 wherein said addition product is cleaved at a temperature between about 40°C. and about 70°C.

7. A process according to claim 1 wherein said $R_3$ has from 4 to 6 carbon atoms.

8. A process according to claim 1 wherein $R_1$ is hydrogen, $R_2$ is methyl and $R_3$ is t-butyl, said alkene is isobutene, and said oxathiazinone is 6-methyl-3,4-dihydro-1,2,3-oxathiazine-4-one-2,2-dioxide.

9. A process according to claim 1 wherein said aprotic diluent is benzene, toluene, xylene, diethyl ether, diisopropyl ether, glycol dimethyl ether, diethylene-glycoldimethyl ether, methylene chloride, propylene chloride, chloroform, carbon tetrachloride, trichloroethylene, tetrachloroethylene, ethylacetate, butylacetate or propionic acid methyl ester.

10. A process according to claim 1 wherein said β-ketocarboxylic acid-t-alkyl ester is acetoacetic acid-tert.-butyl ester, propionylacetic acid-tert.-butyl ester, butyroylacetic acid-tert.-butyl ester, isobutyroylacetic acid-tert.-butyl ester, valeroylacetic acid-tert. α-butyl ester, α-methylacetic acid-tert.-butyl ester, α-propylpropionylacetic acid-tert.-butyl ester or acetoacetic acid-tert.-hexyl ester.

* * * * *